United States Patent
Samarkin et al.

(10) Patent No.: US 12,071,590 B2
(45) Date of Patent: Aug. 27, 2024

(54) METHODS FOR INCREASING THE HARDNESS OF SUBTERRANEAN FORMATIONS

(71) Applicants: SAUDI ARABIAN OIL COMPANY, Dhahran (SA); KING FAHD UNIVERSITY OF PETROLEUM & MINERALS, Dhahran (SA)

(72) Inventors: Yevgeniy Samarkin, Dhahran (SA); Murtada Saleh Aljawad, Dhahran (SA); Abduljamiu Olalekan Amao, Dhahran (SA); Murtadha J. Al-Tammar, Dhahran (SA); Khalid Mohammed Alruwaili, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/156,956

(22) Filed: Jan. 19, 2023

(65) Prior Publication Data
US 2024/0247181 A1 Jul. 25, 2024

(51) Int. Cl.
C09K 8/66 (2006.01)
(52) U.S. Cl.
CPC .................. C09K 8/665 (2013.01)
(58) Field of Classification Search
None
See application file for complete search history.

(56) References Cited

U.S. PATENT DOCUMENTS

| | | | | |
|---|---|---|---|---|
| 3,191,676 A | * | 6/1965 | Froning | C09K 8/58 166/275 |
| 2016/0017208 A1 | * | 1/2016 | Coates | C09K 8/58 507/274 |
| 2018/0291720 A1 | * | 10/2018 | Cairns | C09K 8/845 |
| 2019/0257182 A1 | * | 8/2019 | Couves | G05B 13/048 |

(Continued)

OTHER PUBLICATIONS

Alramahi, B., Sundberg, M.I. (2012). Proppant Embedment and Conductivity or Hydraulic Fractures in Shales. US Rock Mechanics / Geomechanics Symposium. Chicago, Illinois. 2012. Copyright 2012 ARMA, American Rock Mechanics Association.

(Continued)

*Primary Examiner* — Andrew Sue-Ako
(74) *Attorney, Agent, or Firm* — Vorys, Sater, Seymour and Pease LLP (57) ABSTRACT

Carbonates, such as chalk and limestone, are rather soft minerals and may lose at least some mechanical integrity after undergoing stimulation. For instance, carbonate minerals may experience proppant embedment or asperity weakening after fracturing or matrix acidizing. Methods for hardening a carbonate mineral may comprise: introducing an aqueous carrier fluid comprising an ammonium phosphate salt into a subterranean formation comprising a carbonate mineral, and interacting the carbonate mineral with the ammonium phosphate salt to convert at least a portion of the carbonate mineral into a hydroxyapatite mineral. The subterranean formation may exhibit an increased hardness after forming the hydroxyapatite mineral. The ammonium phosphate salt may be diammonium hydrogen phosphate in some examples.

15 Claims, 2 Drawing Sheets (56) References Cited

U.S. PATENT DOCUMENTS

2021/0062073 A1* 3/2021 Gomaa ................. C09K 8/74
2022/0127521 A1* 4/2022 McRobbie .......... E21B 43/2405

OTHER PUBLICATIONS

Barton, N. R., Bandis, S. C., Bakhtar, K. 1985. Strength, deformation and conductivity coupling of rock joints. International Journal of Rock Mechanics and Mining Sciences & Geomechanics.
Kamiya, M., Hatta, J., Shimada, E., Ikuma, Y., Yoshimura, M., Monma, H., 2004. AFM analysis of initial stage of reaction between calcite and phosphate. Mater. Sci. Eng. B 111, 226-231. https://doi.org/10.1016/j.mseb.2004.05.007.
Makurat, A. and Gutierrez, M. 1996. Fracture Flow and Fracture Cross Flow Experiments. Society of Petroleum Engineers. SPE Annual Technical Conference and Exhibition, Denver, CO. 1996. SPE-36732-MS. DOI: 10.2118/36732-MS.
Mueller, M., Amro, M. (2015). Indentation Hardness for Improved Proppant Embedment Prediction in Shale Formations. SPE European Damage Conference and Exhibition. Budapest, Hungary. Copyright 2015, Society of Petroleum Engineers.
Rickman, R., Mullen, M. J., Petre, J. E., Grieser, W. V., & Kundert, D. (Jan. 1, 2008). A Practical Use of Shale Petrophysics for Stimulation Design Optimization: All Shale Plays Are Not Clones of the Barnett Shale. Society of Petroleum Engineers. doi: 10.2118/115258-MS.

* cited by examiner

METHODS FOR INCREASING THE HARDNESS OF SUBTERRANEAN FORMATIONS

FIELD OF THE DISCLOSURE

The present disclosure relates generally to subterranean stimulation operations and, more particularly, to chemical consolidation of carbonate minerals within subterranean formations.

BACKGROUND OF THE DISCLOSURE

Stimulation operations are commonly used during oil and gas production to increase the productivity of a subterranean formation by increasing the permeability of the formation matrix. Common stimulation operations include hydraulic fracturing, matrix acidizing, or acid-fracturing techniques.

Hydraulic fracturing may introduce a fluid into a subterranean formation at a high pressure to generate conductive pathways, commonly referred to fractures, within the formation matrix. The fractures may increase the permeability of the subterranean formation and improve hydrocarbon production. Hydraulic fracturing operations commonly utilize particulates, referred to as proppants, to keep the fractures open after the hydraulic pressure is released. Matrix acidizing generates porosity within a subterranean formation by dissolving a portion of the formation matrix to generate flow channels, commonly referred to as wormholes, therein. Acid-fracturing operations may combine aspects of both hydraulic fracturing and matrix acidizing operations to increase the permeability of a subterranean formation.

Although hydraulic fracturing and matrix acidizing may desirably increase the permeability of a subterranean formation, these operations are not without their difficulties. In soft or ductile subterranean formations, proppants may become embedded within a fracture, thereby reducing the effective fracture width. The terms "embedment" and other grammatical forms thereof refer to the process whereby proppant particulates become at least partially pushed into the formation matrix when placed under compressive stress within a fracture, thereby decreasing the effective fracture width compared to the width of the fully open fracture. Matrix acidizing may weaken the mechanical integrity of the formation matrix and lead to collapse of wormholes. Acid may also weaken fracture asperities in acid-fracturing operations and lead to at least partial fracture closure, even if the subterranean formation is not overly soft or ductile on the whole. Regardless of origin, the foregoing types of subterranean formation damage may decrease hydrocarbon production resulting from a stimulation operation due to a sub-optimal increase in permeability being realized. Formation damage of the foregoing types may be especially prevalent when stimulating subterranean formations comprising a carbonate mineral.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to embodiments consistent with the present disclosure, methods for hardening a carbonate mineral within a subterranean formation comprise: introducing an aqueous carrier fluid comprising an ammonium phosphate salt into a subterranean formation comprising a carbonate mineral; and interacting the carbonate mineral with the ammonium phosphate salt to convert at least a portion of the carbonate mineral into a hydroxyapatite mineral. The subterranean formation has an increased hardness after forming the hydroxyapatite mineral.

In other embodiments consistent with the present disclosure, methods for stimulating a subterranean formation in conjunction with carbonate mineral hardening comprise: stimulating a subterranean formation comprising a carbonate mineral by performing matrix acidizing, hydraulic fracturing, or any combination thereof upon the subterranean formation; after stimulating the subterranean formation, introducing an aqueous carrier fluid comprising an ammonium phosphate salt into the subterranean formation; and converting at least a portion of the carbonate mineral into a hydroxyapatite mineral by interacting the carbonate mineral with the ammonium phosphate salt. The subterranean formation has an increased hardness after forming the hydroxyapatite mineral.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments in accordance with the present disclosure generally relate to subterranean stimulation operations and, more particularly, to chemical consolidation of carbonate minerals within subterranean formations.

The present disclosure addresses the difficulties associated with stimulating soft and ductile formations, such as subterranean formations comprising a carbonate mineral. In particular, the present disclosure addresses the foregoing issue by increasing the hardness of the carbonate mineral within the subterranean formation, thereby increasing the mechanical strength of the formation matrix to decrease the likelihood of proppant embedment and weakening of asperities. Increasing the hardness of the carbonate mineral may take place through chemical consolidation, as discussed in more detail below. Although chemical consolidation has been utilized for hardening sandstone formations and other siliceous formations, such techniques have been sparsely utilized for carbonate formations and not by the approach specified herein.

The concept of chemical consolidation in sandstone and other siliceous formations is based on the deposition of a mineral phase within the existing formation matrix, thereby binding individual rock grains together to strengthen or harden the formation matrix. In the present disclosure, chemical consolidation of carbonate formations may be achieved through alteration of the carbonate mineralogy by converting the carbonate mineral into a harder mineral through a dissolution-precipitation reaction. In particular, the carbonate mineral may be treated with an ammonium phosphate salt in the present disclosure to convert at least a portion of the carbonate mineral into a hydroxyapatite mineral to accomplish the foregoing. Advantageously, the conversion of a carbonate mineral into a hydroxyapatite mineral may be accomplished over short time periods under mild reaction conditions, as discussed hereinafter.

As used herein, the term "proppant" refers to particles mixed with hydraulic fracturing fluids to hold fractures open after the hydraulic pressure generated during hydraulic fracturing is relieved.

As used herein, the term "matrix acidizing" refers to the treatment of a subterranean formation with a fluid containing an acid that reacts with the formation matrix. A "fluid" may include liquids, gases, or both liquids and gases.

Methods for increasing the hardness and/or strength of a subterranean formation comprising a carbonate mineral are described herein. Increasing the hardness and/or strength of the subterranean formation may take place through chemical consolidation using an aqueous carrier fluid comprising an ammonium phosphate salt. In some embodiments, increasing the hardness and/or strength of the subterranean formation may take place in conjunction with a stimulation operation, either before, during, or after conducting the stimulation operation.

In some embodiments, methods of the present disclosure may comprise: introducing an aqueous carrier fluid comprising an ammonium phosphate salt into a subterranean formation comprising a carbonate mineral; and interacting the carbonate mineral with the ammonium phosphate salt to convert at least a portion of the carbonate mineral into a hydroxyapatite mineral. The subterranean formation may have an increased hardness after forming the hydroxyapatite mineral. As a non-limiting example, the increased hardness may be characterized as a Brinell hardness. In some embodiments, a stimulation operation may be performed upon the subterranean formation before forming the hydroxyapatite mineral by chemical consolidation.

Accordingly, in some embodiments of the present disclosure, the methods may comprise first stimulating a subterranean formation comprising a carbonate mineral by performing matrix acidizing, hydraulic fracturing, or any combination thereof upon the subterranean formation. After stimulating the subterranean formation, a treatment may be introduced into the subterranean formation to promote conversion of at least a portion of the carbonate mineral into a second mineral, preferably a hydroxyapatite mineral. The treatment may comprise introducing an aqueous carrier fluid comprising an ammonium phosphate salt into the subterranean formation. After converting the carbonate mineral into the second mineral, preferably a hydroxyapatite mineral, the subterranean formation may exhibit an increased hardness.

In the disclosure herein, the subterranean formation may comprise a carbonate mineral, preferably a carbonate mineral comprising calcium (e.g., calcium carbonate) having a Mohs hardness of 3. Examples of carbonate minerals comprising calcium that may be strengthened through the disclosure herein may include, but are not limited to, calcite, aragonite, vaterite, dolomite, the like, and any combination thereof. The calcium carbonate may be in the form of limestone, chalk, marble, or any combination thereof.

In the disclosure herein, the carbonate mineral may be converted to a hydroxyapatite mineral by interacting the carbonate mineral with an ammonium phosphate salt. Suitable ammonium phosphate salts may include, for example, diammonium hydrogen phosphate, ammonium dihydrogen phosphate, or a combination thereof. Preferably, the ammonium phosphate salt comprises, consists of, or consists essentially of diammonium hydrogen phosphate. The ammonium phosphate salt (e.g., diammonium hydrogen phosphate), may convert the carbonate mineral (e.g., calcium carbonate) into a hydroxyapatite mineral via a dissolution-precipitation reaction. Hydroxyapatite is a phosphate mineral having a Mohs hardness of 5. Therefore, converting a carbonate mineral into a hydroxyapatite mineral may increase the hardness of the subterranean formation to facilitate strengthening thereof. The dissolution-precipitation reaction of calcium carbonate and diammonium hydrogen phosphate occurs according to Reaction 1

$$10CaCO_3 + 5(NH_4)_2HPO \rightarrow Ca_{10}(PO_4,CO_3)_6(OH,CO_3)_2 + 5(NH_4)_2CO_3 + 3CO_2 + 2H_2O \quad \text{Reaction 1}$$

in which $CaCO_3$ is calcium carbonate and $(NH_4)_2HPO_4$ is ammonium hydrogen phosphate. Pristine hydroxyapatite is $Ca_{10}(PO_4)_6(OH)_2$. The product of Reaction 1 is written to show that there may be carbonate defects within the hydroxyapatite structure in some cases. Ammonium carbonate $((NH_4)_2CO_3)$ is soluble and does not precipitate with the hydroxyapatite. Other phosphate minerals that may be formed by a dissolution-precipitation of calcium carbonate and diammonium hydrogen phosphate may include a dicalcium phosphate mineral and/or an octacalcium phosphate dihydrate mineral. These species may form as intermediates during the precipitation of hydroxyapatite in some cases.

The ammonium phosphate salt, such as diammonium hydrogen phosphate, may be introduced to the subterranean formation in an aqueous carrier fluid. Suitable aqueous carrier fluids may include, for example, at least one of fresh water (e.g., stream water, lake water, or municipal treated water), salt water (aqueous salt solutions), sea water, brine, non-potable water such as gray water or industrial process water, formation water, produced water, well water, filtered water, distilled water, or any combination thereof. Produced water may include formation water obtained from the subterranean formation or flowback water produced following stimulation of the subterranean formation with an appropriate treatment fluid. As used herein, the term "brine" refers to a saturated aqueous salt solution. An "aqueous salt solution" has a salt concentration (salinity) less than that of brine.

The ammonium phosphate salt, such as diammonium hydrogen phosphate, may have a concentration in the aqueous carrier fluid of about 0.1 M to about 5 M, or about 0.1 M to about 1 M, or about 0.5 M to about 1.5 M, or about 1 M to about 2 M, or about 1.5 M to about 2.5 M, or about 2 M to about 3 M, or about 2.5 M to about 3.5 M, or about 3 M to about 4 M, or about 3.5 M to about 4.5 M, or about 4 M to about 5 M, or about 0.1 M to about 2 M, or about 1 M to about 3 M.

In addition to methods that produce hydroxyapatite to promote increased hardness, other treatments may be suitable for converting a carbonate mineral into a second mineral (other than hydroxyapatite) with an increased hardness. Suitable treatments may include, but are not limited to, tetraethyl orthosilicate, calcium hydroxide, calcium alkoxides, zinc sulfate, zinc nitrate, zinc chloride, barium chloride, sodium fluoride, ammonium fluoride, hydrofluoric acid, cadmium nitrate tetrahydrate, cadmium chloride, lead (II) nitrate, bacteria (e.g., *Myxococcus xanthus* and/or *Bacillus sphaericus*), the like, and any combination thereof.

The presence of the second mineral (e.g., hydroxyapatite) formed by converting the carbonate mineral with a suitable treatment (e.g., diammonium hydrogen phosphate) may be confirmed using techniques including, but not limited to, X-ray diffraction (XRD), scanning electron microscopy (SEM), energy-dispersive X-ray spectroscopy (EDS), the like, and any combination thereof. For example, XRD and/or SEM may be used to visualize the surface of the subterranean formation (or a core sample obtained therefrom) before and after the introduction of the treatment. The surface of the subterranean formation may be physically altered upon conversion of the carbonate mineral into the second mineral (e.g., hydroxyapatite). Techniques such as EDS may be used to confirm the presence of new ions (e.g., phosphorus) in the subterranean formation following the introduction of the treatment.

Conversion of the carbonate mineral into a hydroxyapatite mineral (or other mineral having an increased hardness relative to the carbonate mineral) may take place in conjunction with a stimulation operation. Suitable stimulation operations may include hydraulic fracturing and/or matrix acidizing. Generally, the simulation operation may be performed before converting the carbonate mineral into the hydroxyapatite mineral.

Hydraulic fracturing may be performed to increase permeability of the subterranean formation and increase the amount of hydrocarbons produced therefrom. During a fracturing operation, a hydraulic fracturing fluid (typically containing a plurality of proppant particulates and various optional components to adjust the density and viscosity of the fracturing fluid) are pumped into the subterranean formation above a fracture gradient pressure thereof. The hydraulic pressure causes fractures to open in the subterranean formation, thereby increasing permeability thereof. Once the hydraulic pressure is released, the proppant particulates become disposed in the fractures and maintain the fractures in an open condition. The material comprising the proppant particulates may be chosen based on the particular application and characteristics desired, such as the depth of the subterranean formation in which the proppant particulates will be placed and the crush strength of the proppant particulates under reservoir conditions at the specified subterranean depth. The chemistry of the subterranean formation may also be considered when selecting suitable proppant particulates in some cases. Optionally, a protective and/or hardening coating, such as a resin or epoxy coating, may be applied to the proppant particulates to modify or customize the density or mechanical strength of a selected base proppant material.

Hydraulic fracturing may include three main stages: a pad fluid stage, a proppant-containing fluid stage, and an overflush fluid stage. The pad fluid stage may include pumping a pad fluid into a subterranean formation, which may initiate and propagates fractures in the subterranean formation. The proppant fluid stage may include pumping a proppant-containing fluid into the fractures of the formation, which may facilitate lodging of proppants in the fractures and creating conductive fractures through which hydrocarbons may flow. The overflush fluid stage may include pumping an overflush fluid into the fractures to push the proppant deeper inside the fractures.

Matrix acidizing may similarly be performed to increase permeability of the subterranean formation and increase the amount of hydrocarbons produced therefrom. During matrix acidizing, an acidizing fluid may be employed to stimulate the subterranean formation by dissolving at least a portion of the carbonate mineral in the formation matrix to promote wormhole generation therein. In a carbonate formation, the acid in the acidizing fluid may dissolve portions of the rock formation matrix, thereby increasing porosity of the formation matrix. The acidizing operation may form a plurality of asperities within the subterranean formation (i.e., asperities associated with the wormholes formed therein).

Suitable acidizing fluids may comprise an aqueous acid solution, which may comprise any one or a combination of one or more strong acids and/or one or more weak acids. The term "strong acid" refers to any acid with a logarithmic acid dissociation constant ($pK_a$) value that is less than or equal to 1.0, and the term "weak acid" refers to any acid with a $pK_a$ value that is greater than 1.0. Strong acids that may be present in an acidizing fluid for a carbonate formation may include, but are not limited to, hydrochloric acid, hydrobromic acid, nitric acid, sulfuric acid, the like, and any combination thereof. Weak acids that may be present in an acidizing fluid for a carbonate formation may include, but are not limited to, acetic acid, formic acid, methanesulfonic acid, trifluoromethanesulfonic acid, trifluoroacetic acid, the like, and any combination thereof. In non-limiting examples, the aqueous acid solution may comprise one or more strong and/or weak acids at a concentration ranging from about 10 wt % to about 70 wt %, or about 25 wt % to about 60 wt. %, or about 30 wt % to about 50 wt %, or about 45 wt % to about 60 wt %, or about 35 wt % to about 50 wt %, based on total mass of the acidizing fluid.

Suitable acidizing operations may include pumping a displacement fluid, also referred to as a flush fluid, into the subterranean formation after the acidizing fluid. The displacement fluid may force the acidizing fluid deeper into the subterranean formation and promote wormhole formation therein to increase the porosity of the formation matrix. The displacement fluid may be pumped until all, or nearly all, of the acidizing fluid has been forced into the subterranean formation. In some cases, an acidizing fluid may be incompatible with fluids already present within the subterranean formation, such as a drilling fluid. If there is an issue with fluid incompatibility, a spacer fluid may be pumped into the subterranean formation prior to introducing the acidizing fluid. The spacer fluid may provide separation between the fluid already present within the subterranean formation and the acidizing fluid being introduced thereto.

The process of stimulating a subterranean formation, particularly a soft or ductile subterranean formation comprising a carbonate mineral, may further weaken the mechanical integrity of the formation matrix, or the subterranean formation may already have inherent structural weakness even without a stimulation operation being performed. In the case of inherent or stimulation-induced structural weakness, proppant embedment, increased structural weakness, and/or weak fracture asperities may result. Treatment of the subterranean formation following stimulation via chemical consolidation to form a hydroxyapatite mineral according to the disclosure herein may improve the hardness of the subterranean formation, thereby decreasing proppant embedment and/or increasing the strength of the fracture asperities.

To determine whether the hardness of the subterranean formation has been increased, the hardness of the subterranean formation may be evaluated before and after introducing the ammonium phosphate salt and converting the carbonate mineral into a hydroxyapatite mineral. Suitable testing procedures to evaluate the increase in strength may include a Brazilian disc test, an unconfined compression test, an ultrasonic pulse velocity test, micro-drilling, a scratch test, indentation (e.g., using the Brinell hardness scale), impulse hammering, the like, and any combination thereof. The testing procedure for determining Brinell hardness is specified in the Examples below.

The hardness of the subterranean formation resulting after converting a carbonate mineral into a hydroxyapatite mineral may depend upon the morphology of the carbonate mineral within the subterranean formation. For example, subterranean formations comprising a carbonate mineral may include the carbonate mineral as calcium carbonate, wherein the calcium carbonate may be in the form of limestone or chalk. Chalk-containing subterranean formations may experience a greater increase in hardness compared to a limestone-containing subterranean formation. Without being bound by theory or mechanism, the greater increase in hardness for chalk-containing subterranean formations may result from the lower initial hardness of chalk compared to limestone. That is, there is more room for improvement in the hardness of chalk than there is for limestone.

As a non-limiting example, subterranean formations comprising a carbonate mineral in the form of limestone may exhibit an increase in Brinell hardness of about 5% to about 10%, or about 5% to about 6%, or about 5.5% to about 6.5%, or about 6% to about 7%, or about 6.5% to about 7.5%, or about 7% to about 8%, or about 6.5% to about 7.5%, or about 8% to about 9%, or about 7.5% to about 8.5%, or about 9% to about 10%, or about 5% to about 8%, or about 6% to about 9%, or about 7% to about 10% upon converting at least a portion of the calcium carbonate into hydroxyapatite using diammonium hydrogen phosphate according to the disclosure herein.

As another non-limiting example, subterranean formations comprising a carbonate mineral in the form of chalk may exhibit an increase in Brinell hardness of about 25% to about 35%, or about 25% to about 30%, or about 26% to about 31%, or about 27% to about 32%, or about 28% to about 33%, or about 29% to about 34%, or about 30% to about 35% upon converting at least a portion of the calcium carbonate into hydroxyapatite using diammonium hydrogen phosphate according to the disclosure herein.

By increasing the hardness of the subterranean formation upon conversion of the carbonate mineral into a hydroxyapatite mineral, the subterranean formation may exhibit decreased proppant embedment and/or increased asperity strength. For example, embedment of proppant particulates in a plurality of fractures may decrease by about 25% to about 35%, as measured relative to embedment of the proppant particulates in the plurality of fractures prior to forming the hydroxyapatite mineral. Proppant embedment may be evaluated by measurement of indentation distance during Brinell hardness testing. Similarly, the strength of asperities within the subterranean formation may increase by about 20% to about 50%, as measured relative to the strength of the asperities prior to forming the hydroxyapatite mineral in the subterranean formation. Asperity strength may be measured by an impulse hammering technique to measure the mineral hardness.

Embodiments disclosed herein include:

A. Methods for hardening a carbonate mineral. The methods comprise: introducing an aqueous carrier fluid comprising an ammonium phosphate salt into a subterranean formation comprising a carbonate mineral; and interacting the carbonate mineral with the ammonium phosphate salt to convert at least a portion of the carbonate mineral into a hydroxyapatite mineral; wherein the subterranean formation has an increased hardness after forming the hydroxyapatite mineral.

B. Methods for stimulating a subterranean formation and hardening a carbonate mineral therein. The methods comprise: stimulating a subterranean formation comprising a carbonate mineral by performing matrix acidizing, hydraulic fracturing, or any combination thereof upon the subterranean formation; after stimulating the subterranean formation, introducing an aqueous carrier fluid comprising an ammonium phosphate salt into the subterranean formation; and converting at least a portion of the carbonate mineral into a hydroxyapatite mineral by interacting the carbonate mineral with the ammonium phosphate salt; wherein the subterranean formation has an increased hardness after forming the hydroxyapatite mineral.

Each of embodiments A and B may have one or more of the following additional elements in any combination:

Element 1: wherein the carbonate mineral comprises calcium carbonate.

Element 2: wherein the calcium carbonate is in the form of limestone.

Element 2A: wherein a Brinell hardness of the subterranean formation increases by about 5% to about 10% after forming the hydroxyapatite mineral.

Element 3: wherein the calcium carbonate is in the form of chalk.

Element 3A: wherein a Brinell hardness of the subterranean formation increases by about 25% to about 35% after forming the hydroxyapatite mineral.

Element 4: wherein the ammonium phosphate salt comprises diammonium hydrogen phosphate.

Element 5: wherein the method further comprises: performing a stimulation operation upon the subterranean formation before forming the hydroxyapatite mineral.

Element 6: wherein the stimulation operation comprises hydraulic fracturing, matrix acidizing, or any combination thereof.

Element 7: wherein stimulating comprises hydraulic fracturing, and the hydraulic fracturing introduces a plurality of fractures into the subterranean formation; wherein a plurality of proppant particulates are placed in the plurality of fractures during the hydraulic fracturing.

Element 7A: wherein embedment of the proppant particulates in the plurality of fractures decreases by about 25% to about 35%, relative to embedment of the proppant particulates in the plurality of fractures before forming the hydroxyapatite mineral.

Element 8: wherein stimulating comprises matrix acidizing, and the matrix acidizing forms a plurality of asperities in the subterranean formation.

By way of non-limiting example, exemplary combinations applicable to A and B include, but are not limited to: 1, 1 and 2 and/or 2 and 2A, or 1 and 3 and/or 3 and 3A, and 4; 1, 1 and 2 and/or 2 and 2A, or 1 and 3 and/or 3 and 3A, and 5; 1, 1 and 2 and/or 2 and 2A, or 1 and 3 and/or 3 and 3A, and 5 and 6; and 1, 1 and 2 and/or 2 and 2A, or 1 and 3 and/or 3 and 3A, and 4-6. With respect to B, any of the foregoing may be in further combination with 7, 7 and 7A, or 8. Additional exemplary combinations applicable to B include, but are not limited to, 7 and 7A; 7 and 8, and 7, 7A, and 8.

The present disclosure is further directed to the following non-limiting clauses:

Clause 1. A method comprising:
introducing an aqueous carrier fluid comprising an ammonium phosphate salt into a subterranean formation comprising a carbonate mineral; and
interacting the carbonate mineral with the ammonium phosphate salt to convert at least a portion of the carbonate mineral into a hydroxyapatite mineral;
wherein the subterranean formation has an increased hardness after forming the hydroxyapatite mineral Clause 2. The method of clause 1, wherein the carbonate mineral comprises calcium carbonate.

Clause 3. The method of clause 2, wherein the calcium carbonate is in the form of limestone.

Clause 4. The method of clause 3, wherein a Brinell hardness of the subterranean formation increases by about 5% to about 10% after forming the hydroxyapatite mineral.

Clause 5. The method of clause 2, wherein the calcium carbonate is in the form of chalk.

Clause 6. The method of clause 5, wherein a Brinell hardness of the subterranean formation increases by about 25% to about 35% after forming the hydroxyapatite mineral.

Clause 7. The method of any one of clauses 1-6, wherein the ammonium phosphate salt comprises diammonium hydrogen phosphate.

Clause 8. The method of any one of clauses 1-7, further comprising:
performing a stimulation operation upon the subterranean formation before forming the hydroxyapatite mineral.

Clause 9. The method of clause 8, wherein the stimulation operation comprises hydraulic fracturing, matrix acidizing, or any combination thereof.

Clause 10. A method comprising:
stimulating a subterranean formation comprising a carbonate mineral by performing matrix acidizing, hydraulic fracturing, or any combination thereof upon the subterranean formation;
after stimulating the subterranean formation, introducing an aqueous carrier fluid comprising an ammonium phosphate salt into the subterranean formation; and
converting at least a portion of the carbonate mineral into a hydroxyapatite mineral by interacting the carbonate mineral with the ammonium phosphate salt;
wherein the subterranean formation has an increased hardness after forming the hydroxyapatite mineral.

Clause 11. The method of clause 10, wherein stimulating comprises hydraulic fracturing, and the hydraulic fracturing introduces a plurality of fractures into the subterranean formation;
wherein a plurality of proppant particulates are placed in the plurality of fractures during the hydraulic fracturing.

Clause 12. The method of clause 11, wherein embedment of the proppant particulates in the plurality of fractures decreases by about 25% to about 35%, relative to embedment of the proppant particulates in the plurality of fractures before forming the hydroxyapatite mineral.

Clause 13. The method of clause 10, wherein stimulating comprises matrix acidizing, and the matrix acidizing forms a plurality of asperities in the subterranean formation.

Clause 14. The method of clause 13, wherein plurality of asperities are strengthened by about 20% to about 50%, relative to a strength of the plurality of asperities before forming the hydroxyapatite mineral.

Clause 15. The method of any one of clauses 10-14, wherein the carbonate mineral comprises calcium carbonate.

Clause 16. The method of clause 15, wherein the calcium carbonate is in the form of limestone.

Clause 17. The method of clause 16, wherein a Brinell hardness of the subterranean formation increases by about 5% to about 10% after forming the hydroxyapatite mineral.

Clause 18. The method of any one of clauses 10-14, wherein the calcium carbonate is in the form of chalk.

Clause 19. The method of clause 18, wherein a Brinell hardness of the subterranean formation increases by about 25% to about 35% after forming the hydroxyapatite mineral.

Clause 20. The method of any one of clauses 10-19, wherein the ammonium phosphate salt comprises diammonium hydrogen phosphate.

To facilitate a better understanding of the embodiments described herein, the following examples of various representative embodiments are given. In no way should the following examples be read to limit, or to define, the scope of the present disclosure.

EXAMPLES

Samples of Indiana limestone and Austin chalk were separately treated with diammonium hydrogen phosphate to evaluate the increase in hardness resulting from hydroxyapatite formation. In brief, samples of 3.8 cm×7.6 cm (1.5 inches×3 inches) were fully immersed in a 1 M solution of diammonium hydrogen phosphate in water for 120 hours under ambient conditions. After allowing the samples to dry, the Brinell hardness was measured on both sides of each sample, with measurements being made at five different spots on each side.

The Brinell hardness was determined using a Tinius Olsen FH-9 testing apparatus. Indentations were made using a 62.5 kilogram-force for chalk samples and a 125 kilogram-force for limestone samples, each using a 5 mm indenter ball. After indentation, the indentations were inspected under a microscope to determine the indentation diameter. The applied forces and diameters were then used to calculate the Brinell hardness.

Figure 1:
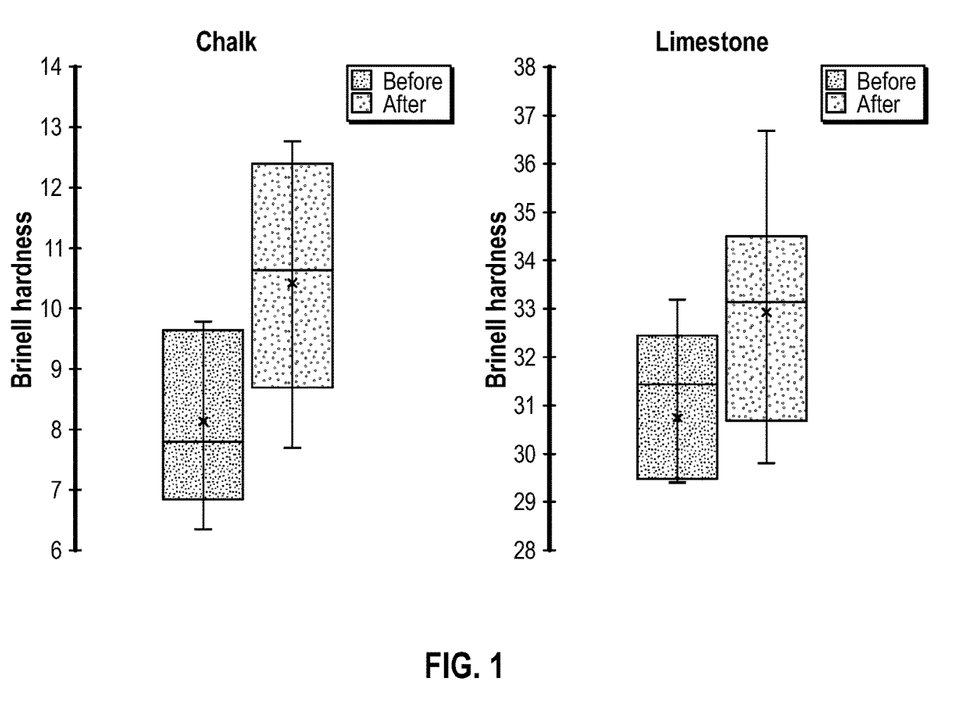
FIG. 1 is a box plot comparing the Brinell hardness of a limestone sample and a chalk sample before and after treatment with diammonium hydrogen phosphate.

The measured hardness values at each location were compared to the hardness before treatment. FIG. 1 is a box plot comparing the Brinell hardness of limestone and chalk samples before and after treatment with diammonium hydrogen phosphate. The top and bottom whiskers represent the maximum and minimum Brinell hardness values measured for each sample, respectively, and the "x" data point represents the average Brinell hardness. The minimum, maximum, and average Brinell hardness values for each sample are also tabulated in Table 1. On average, treatment with diammonium hydrogen phosphate increased the Brinell hardness of the limestone sample by 7% and the chalk sample by 28%. In Table 1, HB represents Hardness Brinell, which is unitless.

TABLE 1

| Parameter | Limestone | | Chalk | |
| --- | --- | --- | --- | --- |
| | Before Treatment | After Treatment | Before Treatment | After Treatment |
| Minimum Hardness [HB] | 24.7 | 29.8 | 6.3 | 7.7 |
| Maximum Hardness [HB] | 33.2 | 36.7 | 9.8 | 12.8 |
| Average Hardness [HB] | 30.8 | 32.9 | 8.1 | 10.4 |
| Average Percent Increase | — | 7% | — | 28% |

Figure 2:
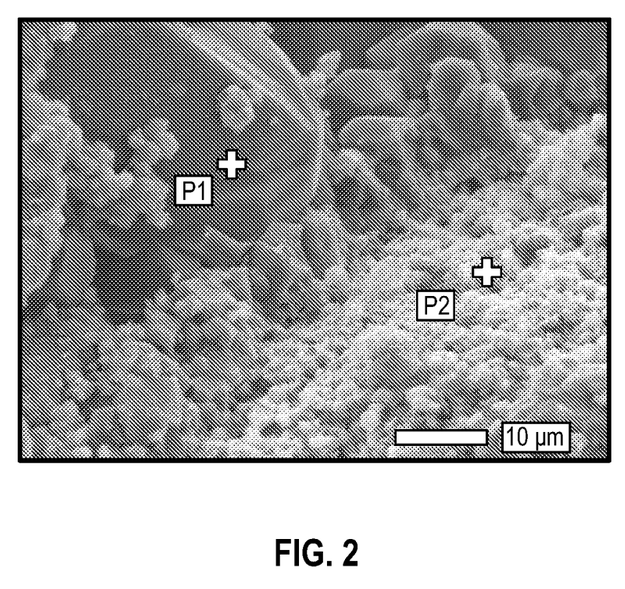
FIG. 2 is an SEM image of a limestone sample after treatment with diammonium hydrogen phosphate.
Figure 3:
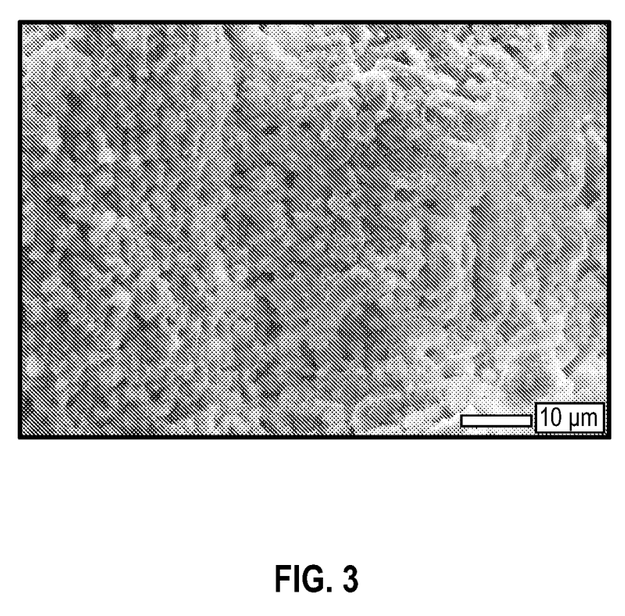
FIG. 3 is an SEM image of a chalk sample after treatment with diammonium hydrogen phosphate.

Scanning electron microscopy (SEM) images of the limestone and chalk samples were collected to observe the change in surface features after formation of the hydroxyapatite upon treatment with diammonium hydrogen phosphate. FIGS. 2 and 3 are SEM images of limestone and chalk samples, respectively, after treatment with hydroxyapatite. Both SEM images showed the presence of hydroxyapatite crystals on a majority of the surface of the samples. Location P1 in FIG. 2 showed a point on the surface of the limestone where conversion of calcium carbonate into hydroxyapatite was incomplete. In addition, EDS analysis of the limestone sample at location P1 confirmed lack of phosphorus (and consequently hydroxyapatite). Other representative locations (e.g., P2) showed the presence of phosphorus by EDS, indicating the likely presence of hydroxyapatite. The EDS analyses are summarized in Table 2. Visually, the formation of hydroxyapatite appeared to be more complete in the chalk sample (FIG. 3).

TABLE 2

| | Atomic Percentages | | | |
| --- | --- | --- | --- | --- |
| Point | Carbon [%] | Oxygen [%] | Phosphorus [%] | Calcium [%] |
| P1 | 16.3 | 47.5 | 0 | 25 |
| P2 | 3.6 | 14.5 | 2.3 | 64.6 |

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
introducing an aqueous carrier fluid comprising an ammonium phosphate salt into a subterranean formation comprising a carbonate mineral;
wherein the carbonate mineral comprises calcium carbonate, and the calcium carbonate is in the form of limestone or chalk; and
interacting the carbonate mineral with the ammonium phosphate salt to convert at least a portion of the carbonate mineral into a hydroxyapatite mineral;
wherein a Brinell hardness of the subterranean formation increases by about 5% to about 10% after forming the hydroxyapatite mineral when the calcium carbonate is in the form of limestone, and a Brinell hardness of the subterranean formation increases by about 25% to about 35% after forming the hydroxyapatite mineral when the calcium carbonate is in the form of chalk.

2. The method of claim 1, wherein the ammonium phosphate salt comprises diammonium hydrogen phosphate.

3. The method of claim 1, further comprising:
performing a stimulation operation upon the subterranean formation before forming the hydroxyapatite mineral.

4. The method of claim 3, wherein the stimulation operation comprises hydraulic fracturing, matrix acidizing, or any combination thereof.

5. A method comprising:
stimulating a subterranean formation comprising a carbonate mineral by performing hydraulic fracturing upon the subterranean formation;
wherein the hydraulic fracturing introduces a plurality of fractures into the subterranean formation, and a plurality of proppant particulates are placed in the plurality of fractures during the hydraulic fracturing;
after stimulating the subterranean formation, introducing an aqueous carrier fluid comprising an ammonium phosphate salt into the subterranean formation; and
converting a least a portion of the carbonate mineral into a hydroxyapatite mineral by interacting the carbonate mineral with the ammonium phosphate salt;
wherein the subterranean formation has an increased hardness after forming the hydroxyapatite mineral and embedment of the proppant particulates in the plurality of fractures decreases by about 25% to about 35%, relative to embedment of the proppant particulates in the plurality of fractures before forming the hydroxyapatite mineral.

6. The method of claim 5, wherein the carbonate mineral comprises calcium carbonate.

7. The method of claim 6, wherein the calcium carbonate is in the form of limestone.

8. The method of claim 7, wherein a Brinell hardness of the subterranean formation increases by about 5% to about 10% after forming the hydroxyapatite mineral.

9. The method of claim 5, wherein the calcium carbonate is in the form of chalk.

10. The method of claim 9, wherein a Brinell hardness of the subterranean formation increases by about 25% to about 35% after forming the hydroxyapatite mineral.

11. The method of claim 5, wherein the ammonium phosphate salt comprises diammonium hydrogen phosphate.

12. A method comprising:
stimulating a subterranean formation comprising a carbonate mineral by performing matrix acidizing, hydraulic fracturing, or any combination thereof upon the subterranean formation;
wherein the carbonate mineral comprises calcium carbonate, and the calcium carbonate is in the form of limestone or chalk;
after stimulating the subterranean formation, introducing an aqueous carrier fluid comprising an ammonium phosphate salt into the subterranean formation; and
converting at least a portion of the carbonate mineral into a hydroxyapatite mineral by interacting the carbonate mineral with the ammonium phosphate salt;
wherein a Brinell hardness of the subterranean formation increases by about 5% to about 10% after forming the hydroxyapatite mineral when the calcium carbonate is in the form of limestone, and a Brinell hardness of the subterranean formation increases by about 25% to about 35% after forming the hydroxyapatite mineral when the calcium carbonate is in the form of chalk.

13. The method of claim 12, wherein stimulating comprises hydraulic fracturing, and the hydraulic fracturing introduces a plurality of fractures into the subterranean formation;
wherein a plurality of proppant particulates are placed in the plurality of fractures during the hydraulic fracturing.

14. The method of claim 13, wherein embedment of the proppant particulates in the plurality of fractures decreases by about 25% to about 35%, relative to embedment of the proppant particulates in the plurality of fractures before forming the hydroxyapatite mineral.

15. The method of claim 12, wherein the ammonium phosphate salt comprises diammonium hydrogen phosphate.

* * * * *